United States Patent
Schmitt

(10) Patent No.: US 8,500,866 B2
(45) Date of Patent: Aug. 6, 2013

(54) METHOD AND DEVICE FOR THE TREATMENT OF PRODUCT GAS PRODUCED BY PRESSURE GASIFICATION OF SOLID FUELS

(75) Inventor: Gerhard Schmitt, Schmitten (DE)

(73) Assignee: Lurgi Clean Coal Technology (Proprietary) Limited, Bryanston (ZA)

( * ) Notice: Subject to any disclaimer, the term of this patent is extended or adjusted under 35 U.S.C. 154(b) by 478 days.

(21) Appl. No.: 12/601,460

(22) PCT Filed: May 23, 2008

(86) PCT No.: PCT/EP2008/004147
§ 371 (c)(1),
(2), (4) Date: Sep. 28, 2010

(87) PCT Pub. No.: WO2008/141839
PCT Pub. Date: Nov. 27, 2008

(65) Prior Publication Data
US 2011/0126542 A1    Jun. 2, 2011

(30) Foreign Application Priority Data
May 24, 2007  (DE) .................. 10 2007 024 312

(51) Int. Cl.
*C21B 13/00* (2006.01)

(52) U.S. Cl.
USPC ............ 95/235; 95/236; 423/226; 423/242.4; 75/433

(58) Field of Classification Search
USPC  . 95/172, 235, 236; 96/234; 60/726; 423/226, 423/242.4; 75/392, 433, 443
See application file for complete search history.

(56) References Cited

U.S. PATENT DOCUMENTS

| 3,853,538 | A | * | 12/1974 | Nemeth | 75/494 |
| 4,235,624 | A | * | 11/1980 | Wagener et al. | 75/496 |
| 4,756,750 | A | * | 7/1988 | Bixler et al. | 75/497 |
| 4,861,369 | A | * | 8/1989 | von Bogdandy et al. | 75/492 |
| 6,027,545 | A | * | 2/2000 | Villarreal-Trevino | 75/490 |
| 6,214,084 | B1 | * | 4/2001 | Saxena et al. | 75/453 |
| 6,235,083 | B1 | * | 5/2001 | Kepplinger et al. | 75/492 |
| 6,986,800 | B2 | * | 1/2006 | Duarte-Escareno et al. | 75/458 |
| 2006/0027043 | A1 | | 2/2006 | Zendejas-Martinez | |

FOREIGN PATENT DOCUMENTS

EP          0143986 A      6/1985

OTHER PUBLICATIONS

English Language Abstract for EP 0143986A.

* cited by examiner

*Primary Examiner* — Frank Lawrence, Jr.
(74) *Attorney, Agent, or Firm* — Norris McLaughlin & Marcus PA

(57) ABSTRACT

Upon cooling to 15 to 45° C., a process for the treatment of raw product gas generated by pressure gasification of solid fuels comprises the removal of HCN and NH3 in a preliminary stage, of H2S and COS and possibly other sulfur-containing compounds in a first stage and of CO2 in a second stage by physisorption with cold oxygenate, and the pure product gas is supplied to the direct reduction of iron ore as reduction gas and/or as fuel gas. An improvement of the process consists in that recycle gas loaded with CO2 and steam, which is branched off from the circuit of the recycle gas of the direct reduction of iron ore, is admixed to the desulfurized product gas upon removal of the steam contained therein.

9 Claims, 1 Drawing Sheet

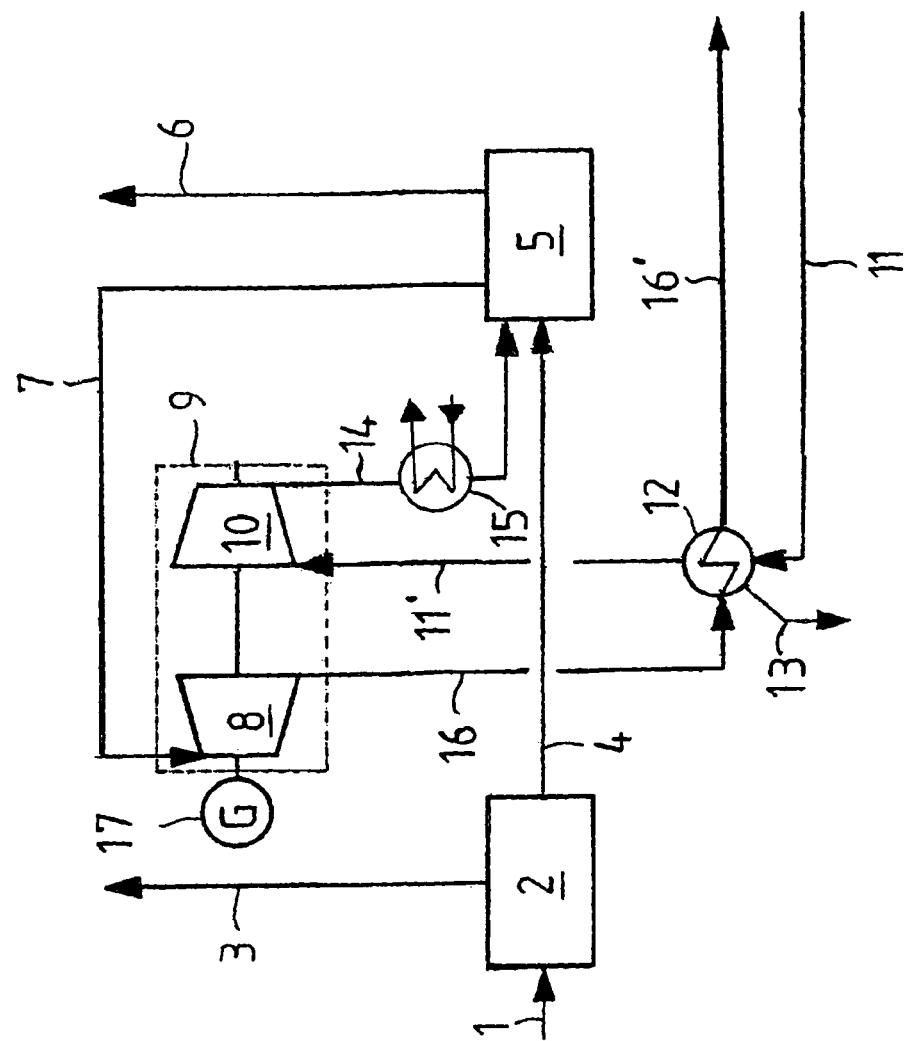

METHOD AND DEVICE FOR THE TREATMENT OF PRODUCT GAS PRODUCED BY PRESSURE GASIFICATION OF SOLID FUELS

This application is a 371 application of PCT/EP2008/004147 filed May 23, 2008, which claims priority to the German application DE 10 2007 024 312.1 filed May 24, 2007.

This invention relates to a process and an apparatus for the treatment of raw product gas generated by pressure gasification of solid fuels at temperatures of 800 to 1500° C. under pressures of 2 to 100 bar[a], preferably 5 to 40 bar[a] and substantially containing $H_2$, GO, $CH_4$, $CO_2$, $N_2$, steam and—depending on the type of fuel—small amounts of one or more of the components $H_2S$, COS, HCN, $NH_3$, $C_nH_m$ and traces of HCN, nickel and iron carbonyls, resin formers, $CS_2$, mercaptans, naphthalenes, thiophenes and organic sulfides, from which upon cooling to temperatures of 15 to 45° C., possibly upon CO conversion, HCN and $NH_3$ are removed in a preliminary stage, $H_2S$, COS and possibly present other sulfur-containing compounds are removed in a first stage and $CO_2$ is removed in a second stage by physisorption with oxygenate having temperatures of +10 to −80° C., and the pure product gas is supplied to the direct reduction of iron ore as reduction gas and/or fuel gas.

By means of pressure gasification, solid fuels such as peat, lignite, coke, hard coal, biomass or the like with an ash content of up to 50 wt-% and a water content of up to 50 wt-% can be gasified with a countercurrently guided mixture of steam and oxygen or air under pressures of 1 to 100 bar[a] at temperatures below the melting point of the ashes contained in the respective fuel to obtain raw product gas (Ullmann's Encyclopedia of Industrial Chemistry, Vol, A12, VCH Verlagsgesellschaft mbH, Weinheim 1989, pp. 218 to 226; Lurgi Handbook, Lurgi AG, Frankfurt-on-Main, 1970, Chapter 2.1). From the raw product gas under a pressure of 5 to 40 bar[a], the undesired components contained therein, i.e. $CO_2$, $CH_4$, steam, N2, Ar, $H_2S$, COS, HCN, $NH_3$, nickel and iron carbonyls, resin formers, $CS_2$, mercaptans, naphthalenes, thiophenes, organic sulfides and $C_nH_m$, can be absorbed in several zones with cold oxygenates such as CH3OH or DME by the co-called Rectisol® process (Company Brochure No. 1676e/07.02/10, Lurgi ÖI. Gas. Chemie GmbH, Frankfurt 2002), with $CO_2$ being removed in the last zone. The loaded oxygenate is regenerated by expanding, evacuating and heating and is reused subsequently. The undesired components can be recovered from the waste gases or condensates.

Surprisingly, it has been found that the above-described process for cleaning raw product gas generated by pressure gasification of solid fuels, which is based on the capability of cold oxygenate, in particular $CH_3OH$, to remove all gas impurities from the raw product gas in a single process step, can also be used for removing $CO_2$ from the circulating recycle gas loaded with $CO_2$ and steam, which is formed during the direct reduction of iron ore. Depending on the direct reduction process used, the recycle gas has temperatures in the range from 50 to 250° C. at pressures in the range from 2 to 8 bar[a].

In direct reduction, iron ore in the form of pellets with a grain size of 3 to 15 mm or also as lump ore with a grain size of 3 to 20 mm is heated to reduction temperature in a rotary kiln by using product gas serving as reducing agent and is directly reduced to sponge-like metallic iron. The reaction of the product gas with the iron ore produces $CO_2$ and steam, which must continuously be removed from the circulating recycle gas, in that $CO_2$, possibly together with sulfur compounds contained in the recycle gas, is removed by condensation by a chemisorptive gas wash and steam.

It is the object of the present invention to liberate the circulating recycle gas from steam in a process for the direct reduction of iron ore and to subject such recycle gas to a physisorptive gas wash for removing the $CO_2$ contained in the recycle gas.

This object is solved in that recycle gas loaded with steam and $CO_2$, which has temperatures of 50 to 250° C. at pressures of 2 to 8 bar[a] is branched off from the circuit of the recycle gas of the direct reduction of iron ore, is cooled to temperatures of 15 to 45° C., compressed to pressures of 25 to 75 bar[a] and, liberated from steam, is admixed to the desulfurized product gas prior to the physisorptive removal of $CO_2$. Due to this measure, the recycle gas branched off from the circuit of the recycle gas of the direct reduction of iron ore with a low pressure of 2 to 8 bar[a] can be compressed to the pressures of 25 to 75 bar[a] necessary for the physisorptive removal of $CO_2$, and at the same time $CO_2$ can thus be separated from the desulfurized product gas and the recycle gas. Due to this measure, the arrangement of a chemisorptive wash and a water wash directly in the circuit of the recycle gas of the direct reduction of iron ore can be omitted. In addition, the simultaneous physisorptive removal of $CO_2$ from the gas mixture consisting of desulfurized product gas and steam-free recycle gas branched off provides for the liquid sequestration of $CO_2$. The energy required for compressing the recycle gas branched off is obtained by expanding the gas mixture. It is also possible to utilize the excess of energy for producing electrical energy.

The steam contained in the recycle gas branched off is removed by condensation.

In accordance with the further aspect of the invention, the steam contained in the diverted recycle gas cooled to temperatures of 15 to 45° C. and compressed to pressures of 25 to 75 bar[a] is physisorptively removed therefrom with oxygenate.

Expediently, 10 to 80 vol-%, preferably 10 to 60 vol-% of the recycle gas of the direct reduction of iron ore are branched off from its circuit.

One development of the process of the invention consists in that the gas mixture having temperatures of 0 to 30° C. at pressures of 25 to 75 bar[a], which is recovered after the physisorptive removal of $CO_2$, is expanded to the pressures of 2 to 8 bar[a] existing in the circuit of the recycle gas, is heated to temperatures of 150 to 250° C. and fed into the circuit of the recycle gas of the direct reduction of iron ore.

Advantageously, heating the expanded gas mixture having temperatures of 0 to 30° C. is effected in that thermal energy is transmitted from the recycle gas branched off to the gas mixture.

A particular aspect of the invention consists in that the $CO_2$ desorbed by expanding the loaded oxygenate to almost atmospheric pressure is transferred into the supercritical condition and is used for solvent flooding partly deoiled petroleum deposits or for storage in pore reservoirs, cavern reservoirs, depleted natural gas reservoirs or saline aquifers. For this purpose, the desorbed $CO_2$ is compressed to pressures of 10 to 30 bar[a] and cooled to temperatures of −5 to −40° C. For other purposes, compressing the desorbed $CO_2$ to pressures of up to 40 bar[a] is sufficient.

The apparatus for performing the process consists in the arrangements of a shaft turbine with a compressor portion in which CO2-containing recycle gas liberated from most of the steam is compressed to the pressures of the pure product gas, and with an expansion portion, in which the gas mixture recovered is expanded, and with a generator connected with the shaft turbine. In the case of a possible deficit in the energy balance between the recycle gas branched off and the gas mixture fed into the circuit of the recycle gas, the generator is also switchable as an electric motor for compensation.

BRIEF DESCRIPTION OF THE DRAWINGS

FIG. 1 is directed to a flow diagram illustrating an embodiment of the present method and device for the treatment of product gas produced by pressure gasification of solid fuels.

The invention will subsequently be explained in detail by means of a flow diagram schematically illustrated in the drawing and an embodiment:

In a non-illustrated pressure gasifier, 200,000 kg/h of raw product gas (calculated free from water and ash) of the composition 27.8 vol-% $CO_2$, 23 vol-% CO, 28.6 vol-% H2, 9.1 vol-% $CH_4$, 0.4 vol-% $C_nH_m$ and 0.4 vol-% $N_2$ are generated from bituminous coal and upon removal of HCN and $NH_3$ in a non-illustrated preliminary stage and cooling to a temperature in the range from 25 to 45° C., preferably 36° C., are charged via conduit (1) to the first stage (2) of a gas wash at a pressure in the range from 15 to 40 bar[a], preferably 27 bar[a]. In the gas wash, $H_2S$ and COS as well as possibly present other sulfur-containing compounds are absorptively removed from the raw product gas with cold $CH_3OH$ and discharged from the process via conduit (3) with a temperature of 30±5° C. at a pressure of 1.5±0.5 bar[a]. With about the same pressure, the desulfurized product gas having a temperature in the range from 0 to 30° C., preferably 18° C., flows from the first stage (2) of the gas wash via conduit (4) into the second stage (5) of the gas wash, in which $CO_2$ is absorptively removed with cold $CH_3OH$ and discharged from the process via conduit (6) with a temperature of 30±5° C. at a pressure of 1.5±0.5 bar[a].

It is possible to expand the $CH_3OH$ loaded with discharged $CO_2$ and liquefy the desorbed $CO_2$ by transferring it into the critical condition and supply it to some other use. For other uses, it is sufficient to compress the desorbed $CO_2$ to pressures of up to 40 bar[a].

Via conduit (7), the gas mixture leaving the second stage (5) of the gas wash, which is formed of pure product gas and recycle gas free from $CO_2$ and steam and has a temperature in the range from 0 to 30° C., preferably 23° C., at a pressure of 25 to 75 bar[a], preferably 32 bar[a], is fed via conduit (7) into the expansion stage (8) of a shaft turbine (9), in which the gas mixture is expanded to a pressure in the range from 2 to 8 bar[a], preferably 4 bar[a], at a temperature—depending on the composition of the gas mixture—in the range from 0 to 30° C. Recycle gas loaded with $CO_2$ and steam, which is branched off from the circuit of the recycle gas of the direct reduction of iron ore and has a pressure in the range from 2 to 8 bar[a], preferable 4 bar[a], and a temperature in the range from 50 to 250° C., preferably 135° C., which is passed over a heat exchanger (12) traversed by the gas mixture, is supplied to the compression stage (10) of the shaft turbine (9) via conduit (11, 11'). In the heat exchanger (12), most of the steam contained in the recycle gas supplied via conduit (11) is condensed and the condensate is discharged from the process via conduit (13). The recycle gas leaving the compression stage (10) via conduit (14), which upon compression has a pressure in the range from 25 to 75 bar[a], preferably 34 bar[a], at a temperature in the range from 15 to 45° C., preferably 24° C., is introduced into the second stage (5) of the gas wash upon cooling. In the second stage (5), a water column is provided, in which the remaining steam is removed from the recycle gas by cooling and drying with $CH_3OH$. Before entering the second stage (5) of the gas wash, the recycle gas selectively can be guided over a heat exchanger (15) disposed in the conduit (14), so as to first reduce the temperature of the recycle gas. The gas mixture flowing off from the expansion stage (8) of the shaft turbine (9) via conduit (16, 16'), which has a temperature in the range from 0 to 30° C., preferably 10° C., is passed over the heat exchanger (12). Due to the resulting transfer of heat from the recycle gas branched off, the gas mixture supplied to the direct reduction of iron ore is raised to a temperature in the range from 150 to 250° C., preferably 280° C., at a pressure in the range from 2 to 8 bar[a], preferably 6 bar[a]. With the shaft of the shaft turbine (9) a generator (17) is connected, which possibly is switchable as an electric motor.

The invention claimed is:

1. A process for the treatment of raw product gas generated by pressure gasification of solid fuels at temperatures of 800 to 1500° C. under pressures of 2 to 100 bar[a] and substantially containing $H_2$, CO, $CH_4$, $N_2$, steam and—depending on the type of fuel—small amounts of one or more of the components $H_2S$, COS, HCN, $NH_3$, $C_nH_m$ and traces of nickel and iron carbonyls, resin formers, $CS_2$, mercaptans, naphthalenes, thiophenes and organic sulfides and $C_nH_m$, from which upon cooling to temperatures of 15 to 45° C. HCN and $NH_3$ are removed in a preliminary stage, $H_2S$, COS and possibly present other sulfur-containing compounds are removed in a first stage and $CO_2$ is removed in a second stage by physisorption with oxygenate having temperatures of +10 to −80° C., and the pure product gas is supplied to the direct reduction of iron ore as reduction gas and/or fuel gas, wherein recycle gas loaded with steam and $CO_2$, which has temperatures of 50 to 250° C. at pressures of 2 to 8 bar[a], is branched off from a circuit of recycle gas of the direct reduction of iron ore, is cooled to temperatures of 15 to 45° C., compressed to pressures of 25 to 75 bar[a] and, liberated from steam, is admixed to the desulfurized product gas prior to the physisorptive removal of $CO_2$.

2. The process according to claim 1, wherein before entering the preliminary stage, the raw product gas is subjected to a CO conversion.

3. The process according to claim 1, wherein the steam contained in the recycle gas branched off is removed by condensation.

4. The process according to claim 1, wherein steam contained in the diverted recycle gas having temperatures of 15 to 45° C. and compressed to pressures of 25 to 75 bar[a] is physisorptively removed with oxygenate.

5. The process according to claim 1, wherein 10 to 80 vol-%, of the recycle gas are branched off from its circuit.

6. The process according to claim 1, wherein the gas mixture consisting of pure product gas and recycle gas free from $CO_2$ and steam, which is recovered after the physisorptive removal of CO2, has temperatures of 0 to 30° C. at pressures of 25 to 75 bar[a], is expanded to pressures of 2 to 8 bar[a] existing in the circuit of recycle gas, and is heated to temperatures of 150 to 250° C., is fed into the circuit of the recycle gas.

7. The process according to claim 1, wherein the thermal energy contained in the recycle gas branched off is directly transmitted to the gas mixture upon expansion thereof.

8. The process according to claim 1, wherein $CO_2$ desorbed by expanding the loaded oxygenate to almost atmospheric pressure is transferred into the supercritical condition and is used for solvent flooding partly deoiled petroleum deposits or for storage in pore reservoirs, cavern reservoirs, depleted natural gas reservoirs or saline aquifers.

9. The process according to claim 8, wherein the desorbed $CO_2$ is compressed to a pressure of 10 to 30 bar[a] and cooled to a temperature of −40 to −5° C.

\* \* \* \* \*